United States Patent
Vance et al.

(10) Patent No.: US 6,498,600 B1
(45) Date of Patent: Dec. 24, 2002

(54) ELECTRONIC DEVICES INCLUDING KEYPADS THAT ILLUMINATE IN RESPONSE TO PROXIMITY OF A USER AND METHODS OF OPERATING SUCH ELECTRONIC DEVICES

(75) Inventors: Scott L. Vance, Cary, NC (US); Charles Rudisill, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/376,239

(22) Filed: Aug. 18, 1999

(51) Int. Cl.⁷ .................................................. G09G 5/00
(52) U.S. Cl. ...................... 345/168; 345/170; 345/174; 345/169; 200/5 R; 341/26
(58) Field of Search .................... 345/156–179; 341/20–22; 400/472; 200/5 A, 5 R, 314

(56) References Cited

U.S. PATENT DOCUMENTS

| | | | |
|---|---|---|---|
| 4,334,219 A | | 6/1982 | Paülus et al. |
| 4,504,133 A | | 3/1985 | Nakai et al. |
| 4,812,831 A | * | 3/1989 | Laier ............................ 345/175 |
| 5,205,637 A | | 4/1993 | Caspari ........................ 362/109 |
| 5,266,949 A | * | 11/1993 | Rossi ............................ 341/22 |
| 5,278,362 A | * | 1/1994 | Ohashi ......................... 200/5 A |
| 5,523,774 A | * | 6/1996 | Schwartz ..................... 345/168 |
| 5,605,406 A | * | 2/1997 | Bowen ......................... 400/472 |
| 5,825,352 A | * | 10/1998 | Bisset et al. ................. 345/173 |
| 5,828,948 A | | 10/1998 | Almgren et al. ............. 455/34.1 |
| 5,872,559 A | * | 2/1999 | Shieh ........................... 345/157 |
| 5,943,043 A | * | 8/1999 | Furahata et al. ............. 345/173 |
| 6,046,730 A | * | 4/2000 | Bowen et al. ............... 345/168 |
| 6,137,427 A | * | 10/2000 | Binstead ....................... 341/33 |
| 6,211,858 B1 | * | 4/2001 | Moon et al. ................. 345/146 |
| 6,310,609 B1 | * | 10/2001 | Morgenthaler .............. 345/170 |

FOREIGN PATENT DOCUMENTS

| | | | |
|---|---|---|---|
| EP | 0 564 066 A1 | 10/1993 | ............ B60Q/3/02 |
| JP | 09018564 A | 1/1997 | ............ H04M/1/22 |

* cited by examiner

*Primary Examiner*—Steven Saras
*Assistant Examiner*—Amr Awad
(74) *Attorney, Agent, or Firm*—Myers Bigel Sibley & Sajovec (57) ABSTRACT

An electronic device includes a keypad and a sensor that indicates proximity of a user to the electronic device, whereupon the keys of the keypad are illuminated. In particular, when the distance between the user and the sensor is less than a predetermined threshold, the keypad is illuminated in anticipation of the user providing keypad input to the electronic device. The sensor can be an infrared, an ultrasonic or a capacitive sensor. Alternately, the sensor can indicate contact between the user and the sensor, wherein the contact does not provide keypad input to the electronic device, for example, when the user touches but does not push a key of the keypad.

28 Claims, 7 Drawing Sheets

ELECTRONIC DEVICES INCLUDING KEYPADS THAT ILLUMINATE IN RESPONSE TO PROXIMITY OF A USER AND METHODS OF OPERATING SUCH ELECTRONIC DEVICES

FIELD OF THE INVENTION

The present invention relates to the field of electronic devices in general, and more particularly, to electronic devices and methods responsive to user proximity.

BACKGROUND OF THE INVENTION

Many electronic devices, such as radiotelephones, include controls which may be used to operate the electronic devices. For example, a radiotelephone may include a keypad used to input information into the radiotelephone such as telephone numbers to be dialed.

Electronic devices may be used over a wide range of operating conditions. For example, radiotelephones may be used in conditions where the ambient lighting is dim. The radiotelephone may, therefore, have the capability to backlight the keypad to assist the user in seeing the keys more clearly in low-light conditions. More specifically, the backlight may illuminate the keys when the user pushes a button or otherwise invokes an operation of the radiotelephone.

Unfortunately, if the ambient light level is too low for the user to see the controls of the electronic device the user may push an incorrect control, thereby causing the electronic device to carry out an unintended operation or provide erroneous input. Once the controls of the electronic device are illuminated, the user may see the error and wish to correct it. The user may, for example, correct the error by deleting the erroneous input and providing the correct input. In view of the above, there is a need for improved interfaces of electronic devices and methods thereof.

SUMMARY OF THE INVENTION

In view of the above, it is an object of the present invention to allow improved electronic devices and related methods.

It is another object of the present invention to allow improved interfaces to electronic devices and related methods.

It is another object of the present invention to allow reduction in power consumption of electronic devices and related methods.

These and other objects of the present invention are provided methods and apparatus that illuminate keys of a keypad of an electronic device, such as a radiotelephone, when the proximity of a user to a sensor of the electronic device is less than a predetermined threshold. In particular, a processor of the electronic device controls operations of the electronic device. A keypad includes a plurality of keys, wherein the keypad provides keypad input to the electronic device when at least one of the plurality of keys is pushed. A sensor indicates the proximity of the user to the sensor, whereupon the processor determines the proximity of user to the sensor. When the processor determines that the proximity of the user to the sensor is less than the predetermined threshold, a light illuminates the plurality of keys, thereby improving the visibility of the keys. The sensor can be an infrared or capacitive sensor.

Accordingly, the keys of the electronic device can be illuminated without providing keypad input to the electronic device. For example, when a user's finger is within a predetermined threshold distance, the keys of the keypad are illuminated in anticipation of the user wanting to use the keypad. The present invention, therefore, may avoid the need to push a key to illuminate the keys of the keypad, thereby allowing an improved interface to the electronic device for the user. Furthermore, the present invention may provide a reduction in power consumption by avoiding unneeded input simply to illuminate the keys so that the user can provide the intended input.

In a further aspect of the present invention, the light illuminates the keys when the processor determines that a user is in contact with at least one of the keys, wherein the contact between the user and at least one of the keys does not provide keypad input to the electronic device. For example, the light can illuminate the keys of the keypad when the user touches, but does not push, one key.

The sensor may include contacts on the keys and a comparator, electrically connected to the contacts, wherein the comparator provides a voltage level in response to contact with the user. The contacts can be made of a conductive material on the keys such as gold, silver, or copper.

In particular, the contacts can include first and second contacts on keys. The first and second contacts are electrically connected to each other in response to contact between the user and one of the keys. For example, the first and second contacts can be on the faces of the keys so that when the user touches a keyface, the first contact is electrically connected to the second contact which causes a detector to signal the processor that the user is touching a key.

In another aspect of the present invention, the light illuminates the keys when the processor determines that the user is in contact with at least two of the keys, wherein the contact between the user and the two keys does not provide keypad input to the electronic device. For example, the light can illuminate the keys of the keypad when the user touches, but does not push, two of the keys.

In a further aspect of the present invention, the keys of the keypad can be in one of two states: depressed and non-depressed. For example, when a key is pressed the key is in the depressed state and when the key is not pressed, such as when the radiotelephone is not being used, the key is in the non-depressed state. According to the present invention, input can be provided to the radiotelephone when a key is in the depressed or the non-depressed state. For example, input can be provided to the radiotelephone when the user depresses a key or when the sensor detects proximity of the user. As a result, the present invention may allow, for example, increased input with fewer keys or allow the number of keys in the keypad to be reduced.

Detected contact by a user can also be used to initiate operations of the electronic device. For example, a radiotelephone that operates according to the present invention can detect contact between the sensor and the user's face when the user places the radiotelephone near his or her ear. Accordingly, the contact may be used to answer the call rather than by pushing a button or opening a cover of the radiotelephone.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods or devices. Accordingly, the present invention may take the form of an entirely hardware embodiment, an entirely software embodiment or an embodiment combining software and hardware aspects.

It will be understood that when an element such as a key of a keypad is referred to as being "on" another element, it can be directly on the other element or intervening elements may also be present. In contrast, when an element is referred to as being "directly on" another element, there are no intervening elements present. Although the present invention is described herein by reference to a radiotelephone, it will be understood that the present invention may be practiced with any electronic device that includes keys.

Figure 1:
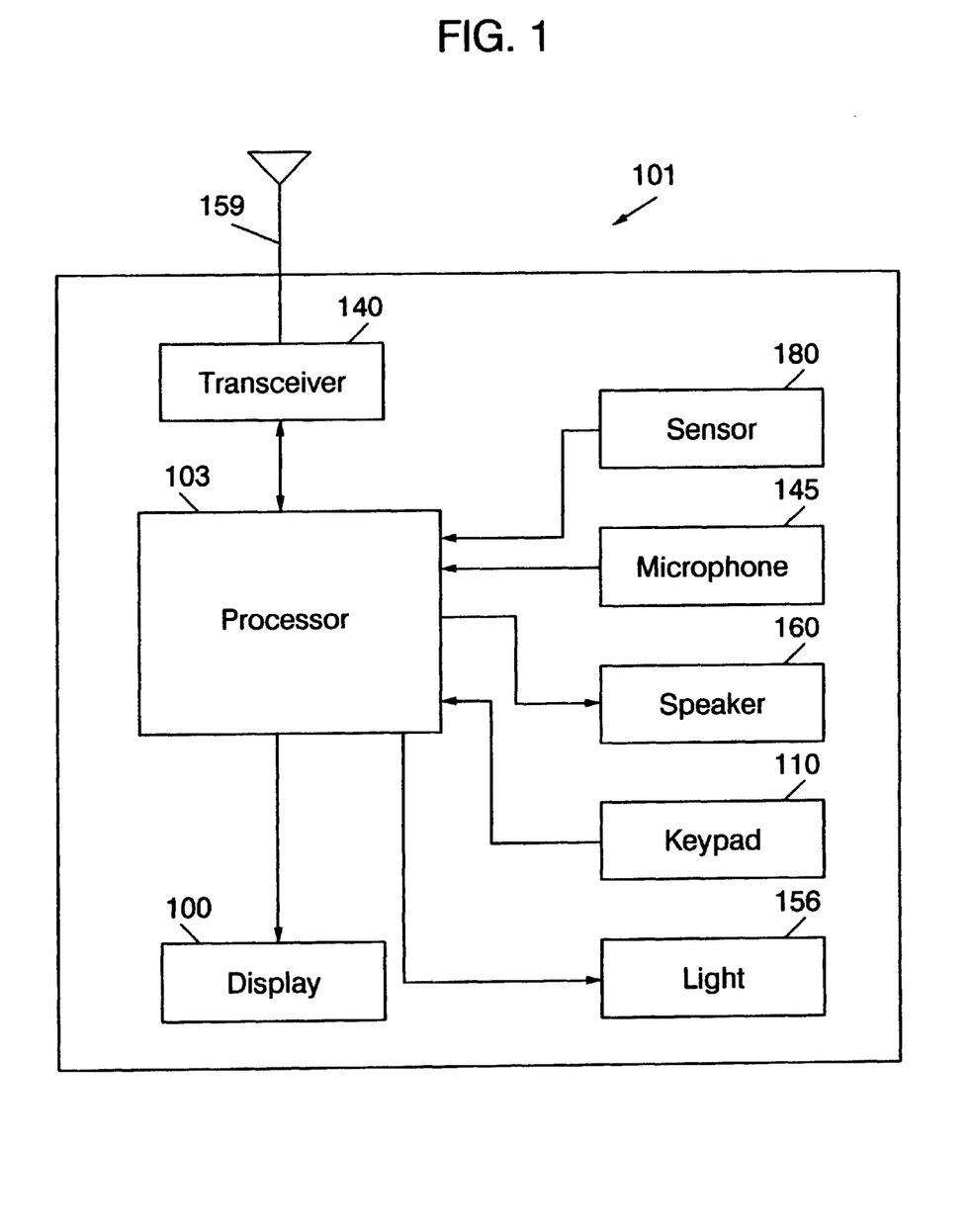
FIG. 1 is a block diagram of a radiotelephone according to the present invention.

FIG. 1 is a block diagram of an embodiment of a radiotelephone 101 according to the present invention. According to FIG. 1, the radiotelephone 101 can be used to communicate within a communications system, such a cellular communications system. Cellular communications systems are discussed, for example, in U.S. Pat. No. 5,828,948 to Almgren, et al. entitled Dynamic allocation of channels in a cellular telephone system which is incorporated herein by reference in its entirety.

As shown in FIG. 1, the radiotelephone 101 includes a keypad 110 which can be used to provide input to the radiotelephone 101. In particular, the keypad 110 includes a plurality of keys that provide input to the radiotelephone 101 when pushed. For example, when the user wishes to initiate a call in the communications system, the user pushes a series of keys that correspond to the number to be dialed. During the call, the user can speak into a microphone 145 which causes the radiotelephone 101 to generate communication signals which are transmitted from the radiotelephone 101. The user may listen to a speaker 160 that produces audio signals generated by the radiotelephone 101 from communication signals received by the radiotelephone 101 during a call. The radiotelephone 101 transmits and receives communication signals via a transceiver 140 over an antenna 159.

During operation, the user may refer to a display 100 of the radiotelephone 101 to observe information relevant to the operation of the radiotelephone 101, such as characters or numbers. For example, the display 100 can be a black and white Liquid Crystal Display (LCD) that displays for example, a telephone number entered by the user or a name stored in the radiotelephone 101. The display 100 may also be used in conjunction with the keypad 110 such as when the user dials a number to place a call.

A processor 103 provides the communications signals to the transceiver 140 for transmission and receives the communications signals from the transceiver for reception. For example, the processor 103 provides communications signals to the transceiver 140 when the user speaks into the microphone 145 and receives communications signals from the transceiver 140 for the reproduction of audio through the speaker 160. The processor 103 generates characters for display on the display 100. For example, the processor 103 generates numbers for display when the user enters a telephone number on the keypad 110. The characters can also be generated by a character generator which is not shown. The microphone 145, speaker 160, keypad 110, and display 100 are coupled to the processor 103 which controls operations of the radiotelephone 101.

A light 156 operates under the control of the processor 103 to illuminate the keys of the keypad 110. A sensor 180 detects the proximity of a user to the radiotelephone 101 and provides an output to the processor 103 indicating the user's proximity. If the processor 103 determines that the proximity of the user is less than a predetermined threshold distance, the processor enables the light 156 to illuminate the keys of the keypad 110 so that the user may clearly see the keys of the keypad 110 without pushing a key to provide input to the radiotelephone 101. The sensor 180 can include a capacitive, an ultrasonic or an infrared sensor. Accordingly, the present invention may allow a more convenient interface to the radiotelephone 101 for the user when the keys are otherwise difficult to distinguish in dim ambient lighting, such as at night or in a dark room.

In addition, the keys of the keypad 110 can be in one of two states: depressed and non-depressed. For example, when a key is pressed the key is in the depressed state and when the key is not pressed, such as when the radiotelephone 101 is not being used, the key is in the non-depressed state. According to the present invention, input can be provided to the radiotelephone when a key is in the depressed or the non-depressed state. For example, input can be provided to the radiotelephone 101 when the user depresses a key or when the sensor 180 detects proximity of the user. As a result, the present invention may allow, for example, increased input with fewer keys or allow the number of keys in the keypad to be reduced.

Figure 2A:
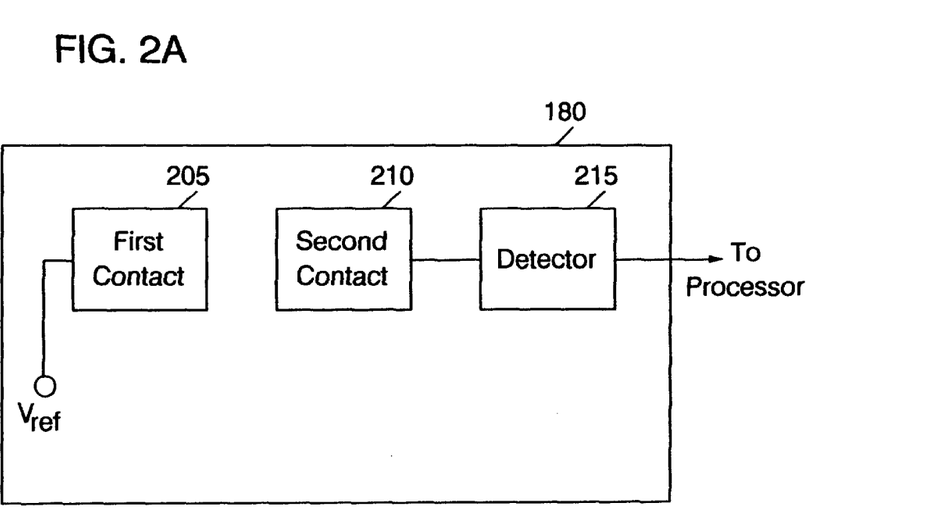
FIGS. 2A and 2B are block diagrams of the sensor shown in FIG. 1.
Figure 2B:
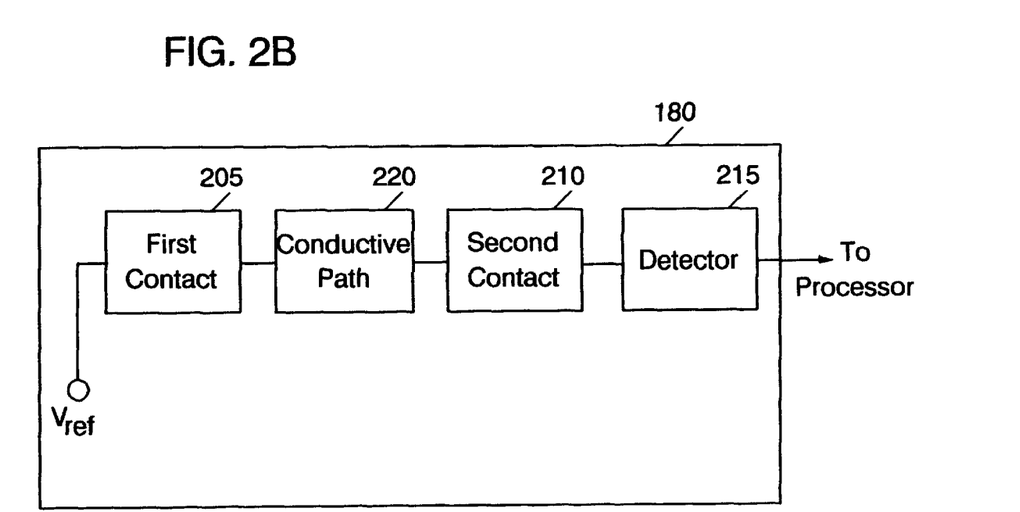

In an alternate embodiment, the sensor 180 indicates contact between the user and at least one of the keys of keypad 110 as shown in FIGS. 2A and 2B. According to FIG. 2A, a first contact 205 is electrically connected to a reference voltage Vref. A second contact 210 is spaced apart from the first contact 205 and is electrically connected to a detector 215. When the user contacts the first contact 205 and the second contact 210, a conductive path 220 is provided to electrically connect the first contact 205 to the second contact 210, thereby electrically connecting the reference voltage Vref to the detector 215 as shown in FIG. 2B. In response, the detector 215 provides a signal to the processor 103 that indicates the contact between the user and the first and second contacts 205, 210. For example, when the user's finger touches the first contact 205 and the second contact 210 the conductive path 220 is provided through the finger to electrically connect the first and second contacts 205, 210.

The present invention may also be used to initiate operations of the radiotelephone 101. For example, the user may answer an incoming call by placing the radiotelephone near his or her ear, thereby coming into contact with the sensor 180. The processor 103 detects the contact and answers the incoming call. Accordingly, the user of a radiotelephone according to the present invention may avoid pushing a button to answer the call, thereby allowing an improved interface to the radiotelephone 101.

Figure 3A:
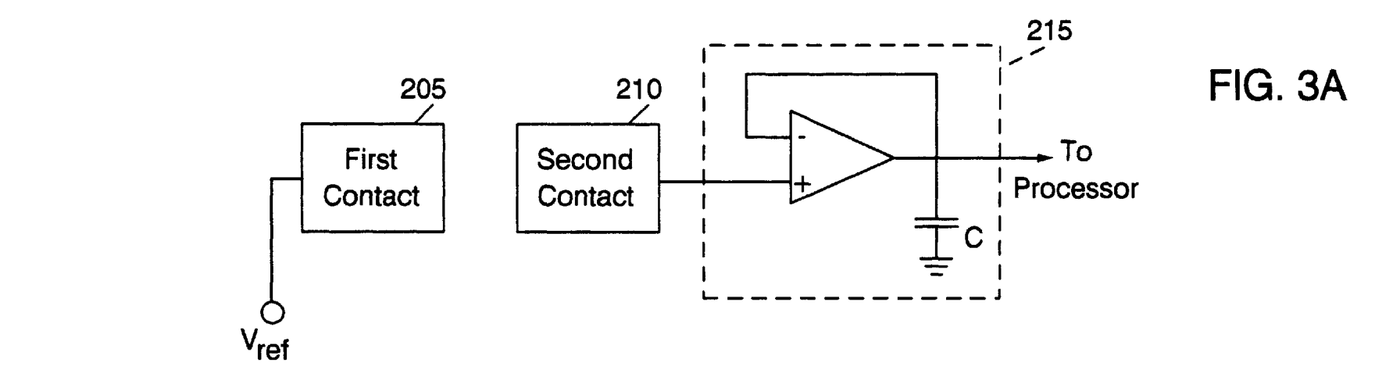
FIGS. 3A and 3B are circuit schematics of the sensor shown in FIG. 2.
Figure 3B:
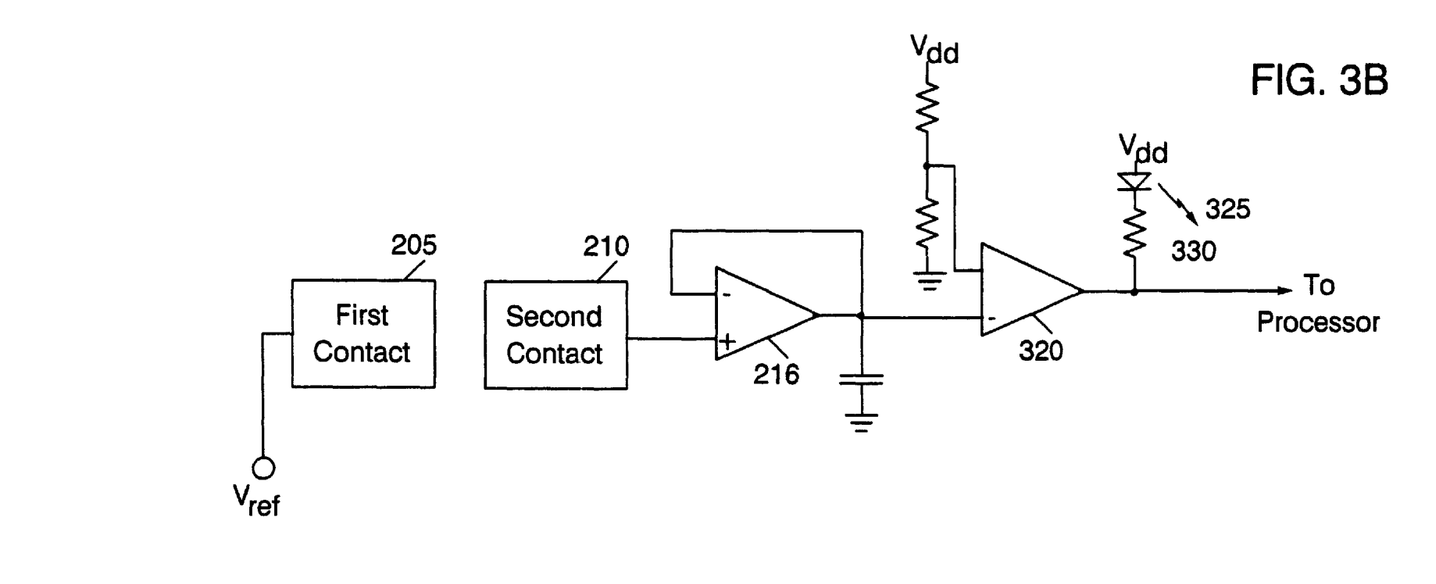

FIG. 3A is a circuit diagram of the detector 215 of FIGS. 2A and 2B. According to FIG. 3A, an amplifier 216 amplifies a portion of the reference voltage Vref provided via the conductive path 220 to provide the indication of contact to the processor 103. FIG. 3B is a more detailed circuit diagram of the sensor 180 of FIGS. 2A and 2B including a test Light Emitting Diode 325 and resistor 330 electrically connected to the output of an amplifier 320 connected in cascade to the amplifier 216.

Figure 4A:
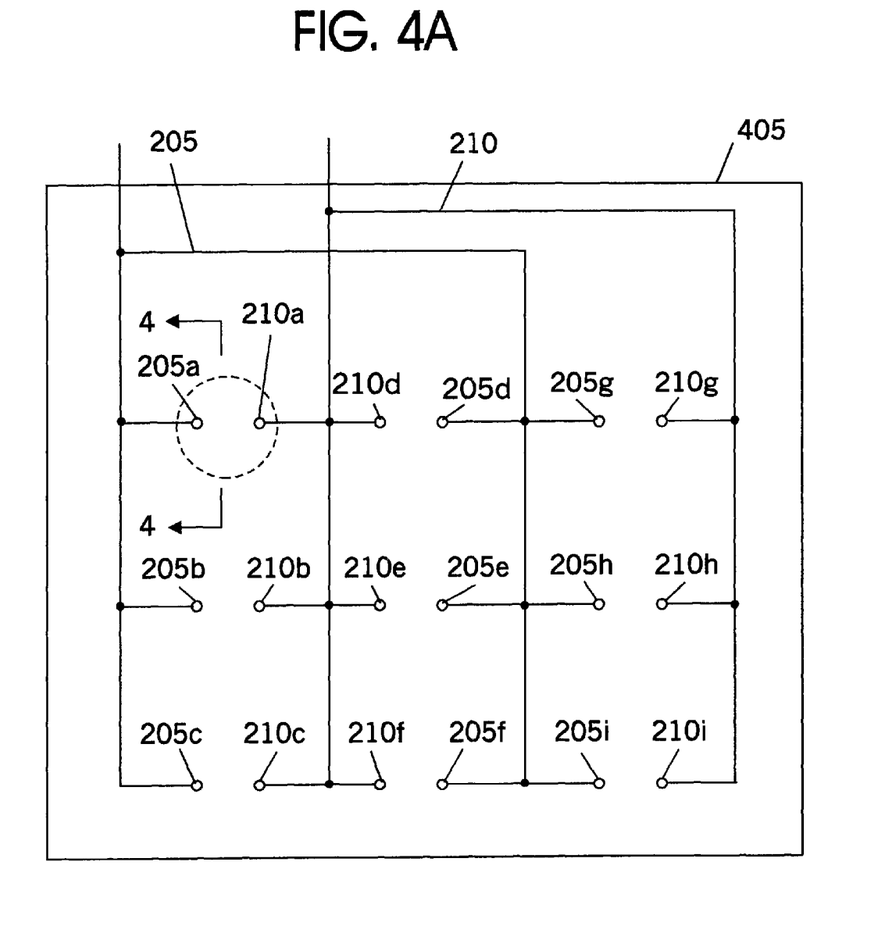
FIG. 4A is a front view of a flexible film including contacts thereon used to form the keypad and sensor of FIG. 1.

FIG. 4A is a diagram of a flexible film 405 used to provide first and second contacts 205a–i, 210a–i of the sensor 180. According to FIG. 4A, first contacts 205a–i and second contacts 210a–i are formed spaced apart on the flexible film 405 so that respective pairs of first and second contacts 205a–i, 210a–i lie within respective regions that define faces of the keys of the keypad 110. For example, first contact 205a and second contact 210a lie within a region 420 that defines a respective keyface for a key of keypad 110.

A conductive material is applied to the keyface regions on the flexible film 405 to provide the first and second contacts 205a, 210a. The conductive material can be applied to the keyface regions in a pattern that improves the likelihood that the first and second contacts 205a, 210a are electrically connected when the user touches the keyface. For example, the conductive material can be applied to the left and right halves of the surface of a keyface, wherein a strip in the center of the keyface electrically isolates the conductive material on the left and right halves. Accordingly, when the user touches the keyface, the left and right halves may be more likely to be electrically connected.

Figure 4B:
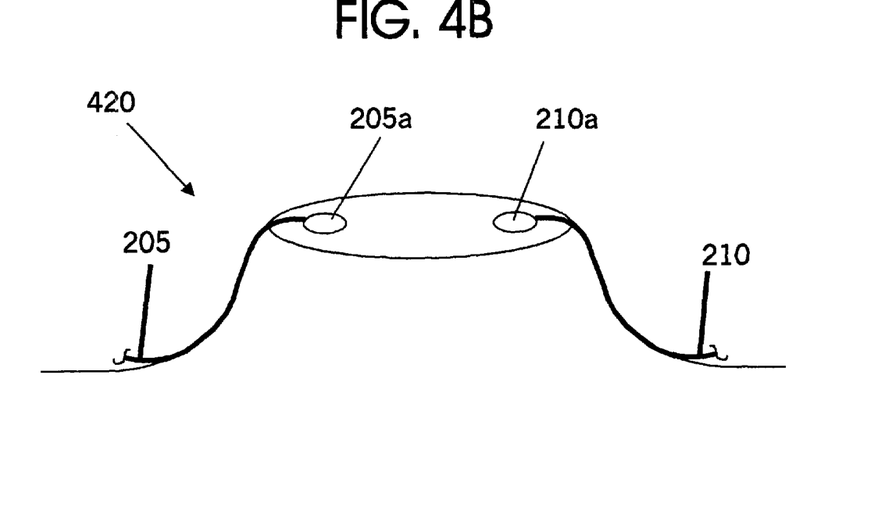
FIG. 4B is a perspective view of a key formed from the flexible film shown in FIG. 4A.

According to FIG. 4B, the flexible film 405, such as polyester Mylar, is heated and vacuum formed in a mold to create respective recesses in the flexible film 405. The recesses correspond to keys of the keypad 110. When the user touches the keyface, the conductive path 220 (FIG. 2B) is formed between the first and second contacts 205a, 210a, thereby electrically connecting the reference voltage Vref to the detector 215, signaling the processor 103 which enables the light 156 to illuminate the keys of the keypad 110. The light 156 can illuminate the keys of the keypad 110 through a white or gray colored flexible film 405 (i.e., backlighted).

Figure 4C:
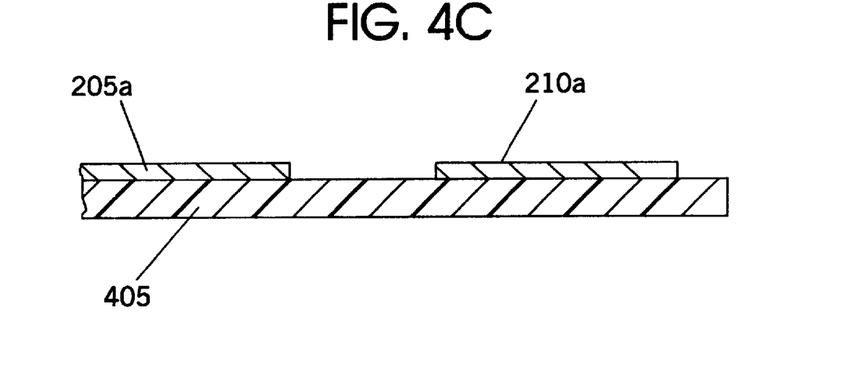
FIG. 4C–4E are enlarged cross-sectional views of the region 420 shown in FIG. 4A taken along line 4–4' that illustrate methods of forming the sensor of FIG. 1 according to the present invention.
Figure 4D:
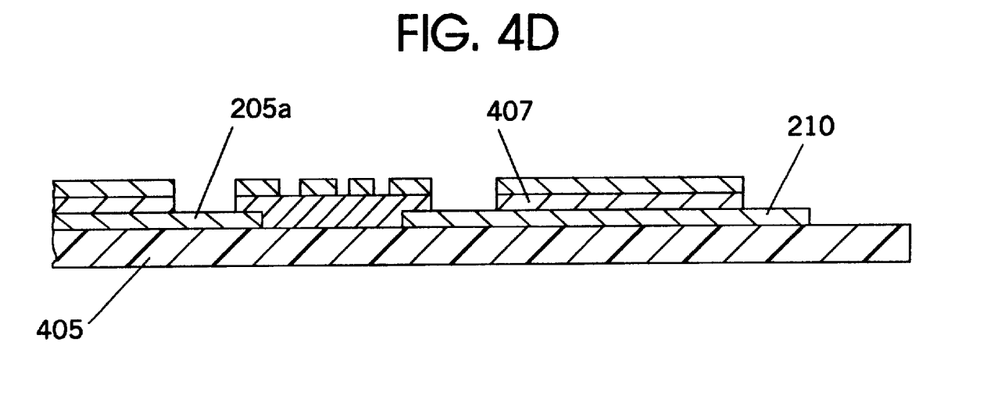
Figure 4E:
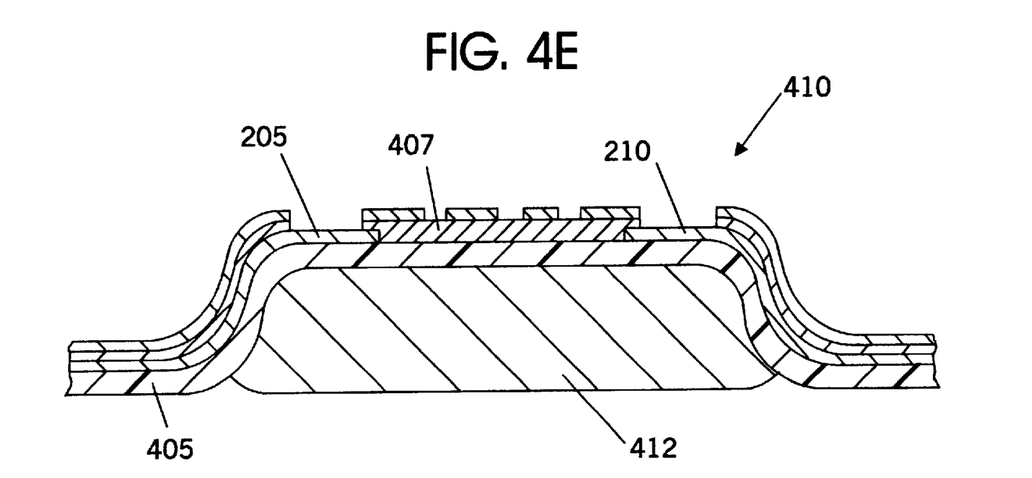

FIGS. 4C–4E illustrate methods of forming keys of the keypad 110 according to the present invention. According to FIG. 4C, conductors are printed or etched on the flexible film 405 to form the first and second contacts 205a–i, 210a–i.

The conductors can be formed using thick-film silver, carbon, or etched copper plated with nickel, chromium, gold, or printed using conductive inks. The conductive ink can comprise, for example, conductive non-corrosive paint, such as a solvent based epoxy, applied to a thickness in a range between about 5 and 50 micrometers. Such conductive paints are marketed, for example, by Antistatic Industries, Inc, of Hackensack, New Jersey and Ercon, Inc. of Wareham, Massachusetts.

Figure 4F:
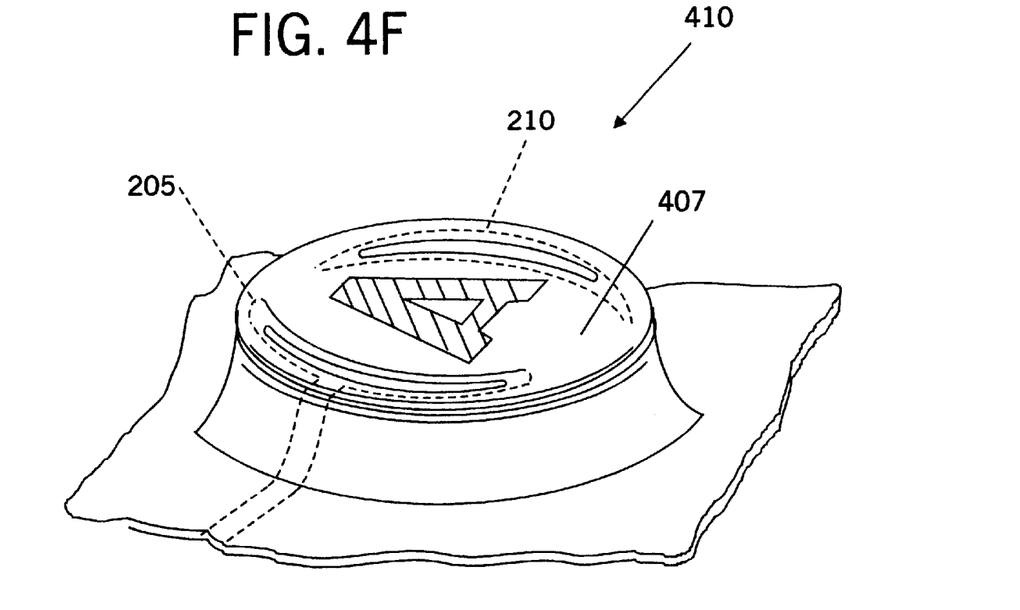
FIG. 4F is an enlarged perspective view of a key including first and second contacts formed according to the present invention.

According to FIG. 4D, ink 407 are printed or laser etched on the flexible film 405 and the conductors to create key nomenclatures, such as numbering, letters, or decorations on the keyfaces. According to FIG. 4E, the flexible film 405 is vacuum formed to create recesses for keys of the keypad 110 including upper surfaces 410 that correspond to the faces of the keys, wherein the keyfaces includes the first and second contacts 205a–i, 210a–i. Keycores 412 are inserted into the respective recesses in the flexible film 405 to provide a structural backing for the keyfaces. The keycores 412 can be discrete plastic components formed via an injection molding process and inserted into the recesses. The polyester film may also be inserted into an injection mold, wherein the tops of the keys are formed during an injection-molding process which forms the keycores. The key nomenclature can be applied before or after the mylar film 405 is vacuum formed. FIG. 4F is a perspective diagram of an exemplary key formed according to the present invention including the first and second contacts 205, 210 on the upper surface 410 of the key and the ink 407 printed thereon to provide the key nomenclature.

Figure 5A:
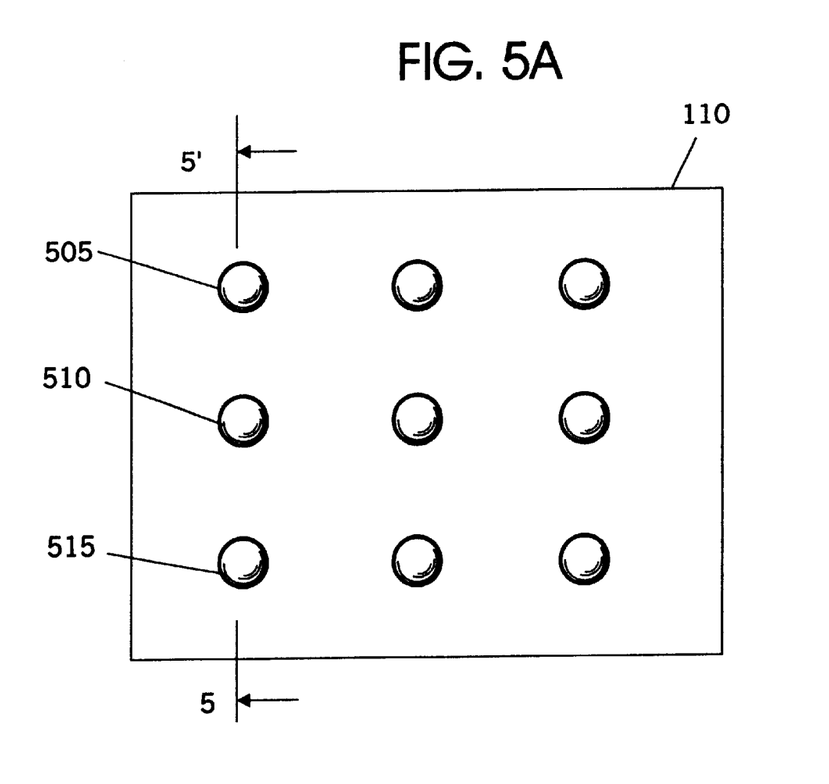
FIG. 5A is a front view of a keypad sheet.
Figure 5B:
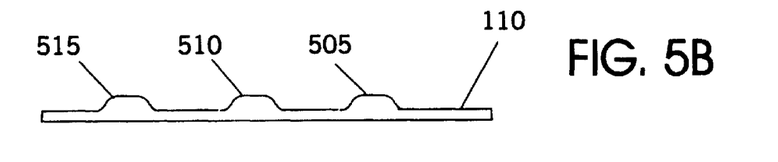
FIG. 5B is an enlarged cross-sectional view of the keypad sheet shown in FIG. 5A taken along line 5–5'.
Figure 5C:
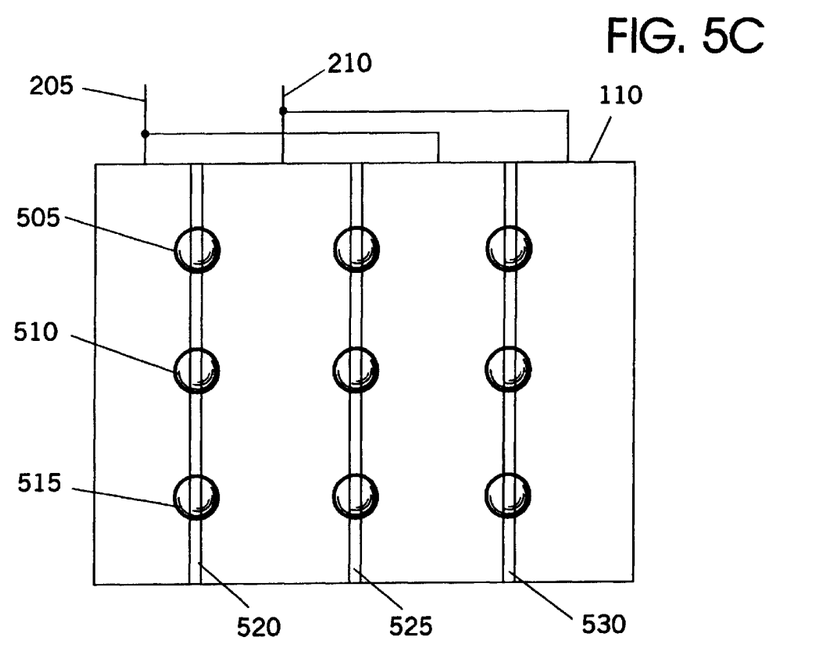
FIG. 5C is a front view of the keypad sheet shown in FIG. 5A having selective masking applied to form the sensor of FIG. 1.

Alternately, the keypad 110 can be formed as a sheet of silicone rubber or injection molded plastic having keys formed therein as shown in FIG. 5A. FIG. 5B is a cross-sectional view of the keypad 110 in FIG. 5A taken along line 5–5' that illustrates the formation of first, second, and third buttons 505,510,515 of the keypad 110. The keypad 110 of FIG. 5A is selectively masked, as shown in FIG. 5C, and a pattern of conductive material is formed thereon using the conductive paint or ink such as those described above. Other methods of producing the conductive pattern include evaporation and sputtering of transparent coating such as indium-tin-oxide. The conductive material is patterned on the keypad 110 to form the first and second contacts 205, 210 as electrically isolated portions of the keypad 110 that are electrically connected when the user touches at least one key of the keypad 110.

For example, according to FIG. 5C, the selective masking described above is used to form the first contact 205 on the left portions of first, second, and third keys 505, 510, 515 and to form the second contact 210 on the right portion of the first, second, and third keys 505, 510, 515 and an isolation region 520 therebetween. The selective masking is removed and the key nomenclature and artwork can be applied to the keys of the keypad 110.

Figure 5D:
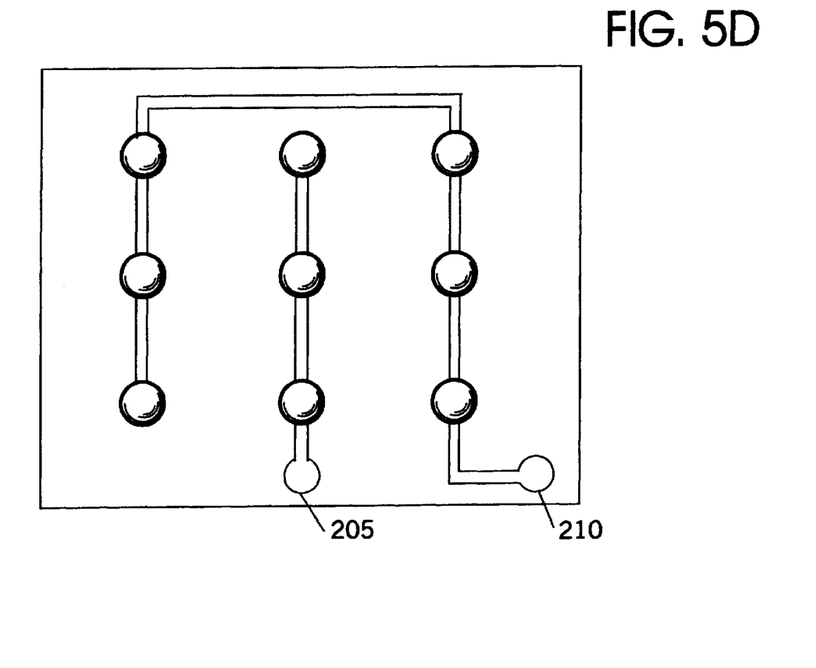
FIG. 5D is a front view of a second embodiment of the keypad and sensor of FIG. 1 according to the present invention.

FIG. 5D is a front view of an alternate embodiment of the keypad 110 of FIG. 1. According to FIG. 5D, the first contact 205 is formed by electrically connecting the center column of keys of the keypad 110 and the second contact 210 is formed by electrically connecting the outside columns of keys of the keypad 110. Accordingly, when a user touches at least one of the keys in either of the outside columns and at least one of the keys in the center column, the conductive path 220 (FIG. 2B) is formed between the first and second contacts 205,210 which indicates contact by the user to the processor 103. The keypad 110 of FIG. 5D can be formed using the methods described above in relation to FIGS. 4A–4F and 5A–5C.

According to the present invention, the keys of the keypad can be illuminated without providing keypad input to the electronic device. The present invention, therefore, may avoid the need to push a key to illuminate the keys of the keypad, thereby allowing an improved interface to the electronic device. Furthermore, the present invention may provide a reduction in power consumption by avoiding unneeded input simply to illuminate the keys so that the user can provide the intended input.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An electronic device comprising:
   a processor that controls operations of the electronic device;
   a keypad, electrically connected to the processor, including a plurality of keys, wherein the keypad provides keypad input to the electronic device when at least one of the plurality of keys is pushed;
   a sensor, electrically connected to the processor, that indicates the proximity of the user to the sensor to the processor, wherein the processor determines the proximity of the user to the sensor;
   a light, electrically connected to the processor, wherein the processor is configured to activate the light to illuminate the plurality of keys when the processor determines that the user is in contact with at least one of the plurality of keys, wherein the contact between the user and the at least one of the plurality of keys does not provide keypad input to the electronic device;
   wherein the sensor includes a plurality of first contacts on the plurality of keys; and
   a plurality of second contacts on the plurality of keys, wherein at least one of the plurality of first contacts is electrically connected to at least one of the plurality of second contacts through the user in response to contact between the user and the at least one of the plurality of keys.

2. The electronic device of claim 1, wherein the light does not illuminate the plurality of keys when the processor determines that the proximity of the user to the sensor indicated by the sensor is more than the predetermined threshold.

3. The electronic device of claim 1, wherein the light illuminates the plurality of keys when the processor determines that the user is in contact with at least two of the plurality of keys, wherein the contact between the user and the at least two of the plurality of keys does not provide keypad input to the electronic device.

4. The electronic device of claim 1, wherein the light does not illuminate the plurality of keys when the processor determines that the user is not in contact with at least one of the plurality of keys.

5. The electronic device of claim 1, wherein the sensor comprises one of a capacitive sensor, an ultrasonic sensor and an infrared sensor.

6. The electronic device of claim 1, wherein the sensor comprises:
   a plurality of contacts on the plurality of keys; and
   a comparator, electrically connected to the plurality of contacts, wherein the comparator provides a voltage level in response to proximity of the user.

7. The electronic device of claim 1, wherein the sensor comprises:
   a plurality of first contacts on a plurality of first keys of the keypad; and
   a plurality of second contacts on a plurality of second keys of the keypad, wherein the plurality of first contacts are electrically connected to the plurality of second contacts in response to contact between the user and at least one of the plurality of first keys and at least one of the plurality of second keys.

8. The electronic device of claim 1, wherein the contacts comprise a conductive material on the plurality of keys.

9. The electronic device of claim 8, wherein the conductive material is selected from a group consisting of gold, silver, copper, chrome, carbon and conductive silicon.

10. The electronic device of claim 1, wherein the keys comprise silicone rubber, injection molded plastic, or a flexible film having conductive ink thereon.

11. A keypad comprising:
    a plurality of keys configured to provide keypad input to an electronic device when at least one of the plurality of keys of the keypad is pushed;
    a sensor, on the plurality of keys, that indicates contact between a user and at least one of the plurality of keys, wherein the contact between the user and the at least one of the plurality of keys does not provide keypad input to the electronic device;
    a light, responsive to the sensor, wherein the light illuminates the keys of the keypad in response to the indication of contact between the at least one of the plurality of keys and the user;
    wherein the sensor includes a plurality of first contacts on the plurality of keys; and
    a plurality of second contacts on the plurality of keys, wherein at least one of the plurality of first contacts is electrically connected to at least one of the plurality of second contacts through the user in response to contact between the user and at least one of the plurality of keys.

12. The keypad of claim 11, wherein the sensor indicates contact between the user and at least two of the plurality of keys.

13. The keypad of claim 12, wherein the sensor comprises:
    a plurality of first contacts on a plurality of first keys of the keypad; and
    a plurality of second contacts on a plurality of second keys of the keypad, wherein the plurality of first contacts are electrically connected to the plurality of second contacts in response to contact between the user and at least one of the plurality of first keys and at least one of the plurality of second keys.

14. The keypad of claim 12, wherein the contacts comprise a conductive material on the plurality of keys.

15. The keypad of claim 14, wherein the conductive material is selected from a group consisting of gold, silver, copper, chrome, carbon and conductive silicon.

16. The keypad of claim 11, wherein the keys comprise silicone rubber, injection molded plastic, or a flexible film having conductive ink thereon.

17. The keypad of claim 11 further comprising:
    a detector, electrically connected to the sensor, that detects the contact between the user and the at least one of the plurality of keys based on the indication of contact from the sensor.

18. A keypad comprising:

means for providing keypad input to an electronic device when at least one of a plurality of keys of the keypad are pushed;

means for sensing contact between a user and at least one of the plurality of keys, wherein the contact between the user and the at least one of the plurality of keys does not provide keypad input to the electronic device;

means for illuminating the plurality of keys in response to the indication of contact between the at least one key and the user;

wherein the means for sensing includes a plurality of first contacts on the plurality of keys; and a plurality of second contacts on the plurality of keys, wherein one of the plurality of first contacts is electrically connected to one of the plurality of second contacts through the user in response to contact between the user and at least one of the plurality of keys.

19. The keypad of claim 18, wherein the means for sensing indicates contact between the user and at least two of the plurality of keys.

20. The keypad of claim 19, wherein the means for sensing comprises:

a plurality of first contacts on a plurality of first keys of the keypad; and a plurality of second contacts on a plurality of second keys of the keypad, wherein the plurality of first contacts are electrically connected to the plurality of second contacts in response to contact between the user and at least one of the plurality of first keys and at least one of the plurality of second keys.

21. The keypad of claim 19, wherein the contacts comprise a conductive material on the plurality of keys.

22. The keypad of claim 21, wherein the conductive material is selected from a group consisting of gold, silver, copper, chrome, carbon and conductive silicon.

23. The keypad of claim 18, wherein the keys comprise silicone rubber, injection molded plastic, or a flexible film having conductive ink thereon.

24. The keypad of claim 19 further comprising:

detector means for detecting the contact between the user and the at least one of the plurality of keys based on the indication of contact from the sensor.

25. A radiotelephone comprising:

a processor that controls operations of the radiotelephone;

a keypad, electrically connected to the processor, including a plurality of keys each having a key face, wherein the keypad provides keypad input to the radiotelephone when at least one of the plurality of keys is pushed;

first and second spaced-apart contacts on at least one of the key faces and an insulating material on the at least one key face between the first and second spaced-apart contacts, wherein the first and second spaced-apart contacts are configured to be electrically connected to one another when the at least one key face is contacted by a user and configured to be electrically insulated from one another in the absence of contact by a user; and a light, electrically connected to the processor, wherein the processor is Configured to activate the light to illuminate the plurality of keys when the processor detects that the first and second spaced-apart contacts are electrically connected, wherein the contact between the user and the at least one key face does not provide keypad input to the radiotelephone.

26. The radiotelephone according to claim 25 wherein the first and second spaced-apart contacts are on respective spaced-apart first and second portions of the at least one key face.

27. The radiotelephone according to claim 26 wherein the first and second spaced-apart contacts comprise conductive ink.

28. The radiotelephone according to claim 25 wherein the at least one key is configured to provide no keypad input to the radiotelephone when in a non-depressed state and configured to provide keypad input to the radiotelephone when in a depressed state.

* * * * *